US012732278B2

(12) United States Patent
Nakamura et al.

(10) Patent No.: US 12,732,278 B2
(45) Date of Patent: Sep. 8, 2026

(54) OPTICAL SIGNAL CONTROLLER, OPTICAL SIGNAL CONTROL METHOD, AND OPTICAL SIGNAL TRANSMISSION SYSTEM

(71) Applicant: NTT, Inc., Tokyo (JP)

(72) Inventors: Masanori Nakamura, Musashino-shi (JP); Mitsuteru Yoshida, Musashino-shi (JP); Etsushi Yamazaki, Musashino-shi (JP); Yoshiaki Kisaka, Musashino-shi (JP)

(73) Assignee: NTT, Inc., Tokyo (JP)

( * ) Notice: Subject to any disclaimer, the term of this patent is extended or adjusted under 35 U.S.C. 154(b) by 344 days.

(21) Appl. No.: 18/565,423

(22) PCT Filed: Jun. 2, 2021

(86) PCT No.: PCT/JP2021/020929

§ 371 (c)(1), (2) Date: Nov. 29, 2023

(87) PCT Pub. No.: WO2022/254594

PCT Pub. Date: Dec. 8, 2022

(65) Prior Publication Data

US 2024/0146420 A1 May 2, 2024

(51) Int. Cl.
*H04B 10/50* (2013.01)
*H04B 10/2507* (2013.01)
(Continued)

(52) U.S. Cl.
CPC ....... *H04B 10/516* (2013.01); *H04B 10/2507* (2013.01); *H04B 10/58* (2013.01)

(58) Field of Classification Search
CPC .............. H04B 10/516; H04B 10/2507; H04B 10/25133; H04B 10/25137; H04B 10/541; H04B 10/58; H04B 10/6165
See application file for complete search history.

(56) References Cited

U.S. PATENT DOCUMENTS 4,672,427 A * 6/1987 Rzeszewski ............ H04N 9/64 348/E9.037
9,036,751 B1 * 5/2015 Wang .................... H04B 10/07 375/348
(Continued)

FOREIGN PATENT DOCUMENTS

JP 6319487 B1 5/2018

*Primary Examiner* — Tanya T Motsinger
(74) *Attorney, Agent, or Firm* — Harness, Dickey & Pierce, P.L.C.

(57) ABSTRACT

According to an aspect of the present invention, an optical signal control apparatus controls a compensation coefficient of an equalizer of an optical transmitter including the equalizer of a symbol period interval and a digital-to-analog converter (DAC) operating at a symbol period interval sampling rate and having a sampling phase adjustment function, and the sampling phase of the DAC. The optical signal control apparatus includes a skew calculation unit configured to calculate a sampling phase amount from a group delay difference between an in-phase component and a quadrature component based on characteristic information of a device and a transmission path and to output the calculated sampling phase amount to the DAC and a compensation coefficient calculation unit configured to calculate the compensation coefficient in which a phase characteristic of a Nyquist frequency of the DAC is 0 or an integer multiple of π and to output the calculated compensation coefficient to the equalizer.

8 Claims, 10 Drawing Sheets

(51) Int. Cl.
*H04B 10/516* (2013.01)
*H04B 10/58* (2013.01)

(56) References Cited

U.S. PATENT DOCUMENTS 11,695,614 B2 * 7/2023 Nayebi ................. H04L 27/364 327/298
12,607,797 B2 * 4/2026 Li ...................... G02B 6/02042
2011/0069767 A1 * 3/2011 Zhu ....................... H04L 27/368 375/259
2011/0075715 A1 * 3/2011 Kravitz ................ H04B 1/0475 375/221
2013/0021048 A1 * 1/2013 Peng .................. G01R 31/2822 324/750.3
2013/0272175 A1 * 10/2013 Zargari .................... H04B 1/50 370/281
2015/0030103 A1 * 1/2015 Hormis ................... H04L 1/243 375/296
2020/0036440 A1 1/2020 Yamagishi et al.
2021/0266009 A1 * 8/2021 Ishii ........................ H03M 1/74
2023/0106338 A1 * 4/2023 Sasai .................. H04B 10/6163 398/208
2024/0146420 A1 * 5/2024 Nakamura ........... H04B 10/541
2024/0283544 A1 * 8/2024 Nakamura ............. H04B 10/58
2024/0283678 A1 * 8/2024 Molina ............... H03M 1/0626
2025/0150194 A1 * 5/2025 Nakamura ......... H04B 10/2507
2025/0226884 A1 * 7/2025 Nakamura ......... H04B 10/2543
2025/0317150 A1 * 10/2025 Sundström .......... H03M 1/0604
2025/0392390 A1 * 12/2025 Kawai ................ H04B 10/2507
2026/0088909 A1 * 3/2026 Li .......................... H04B 10/58

* cited by examiner

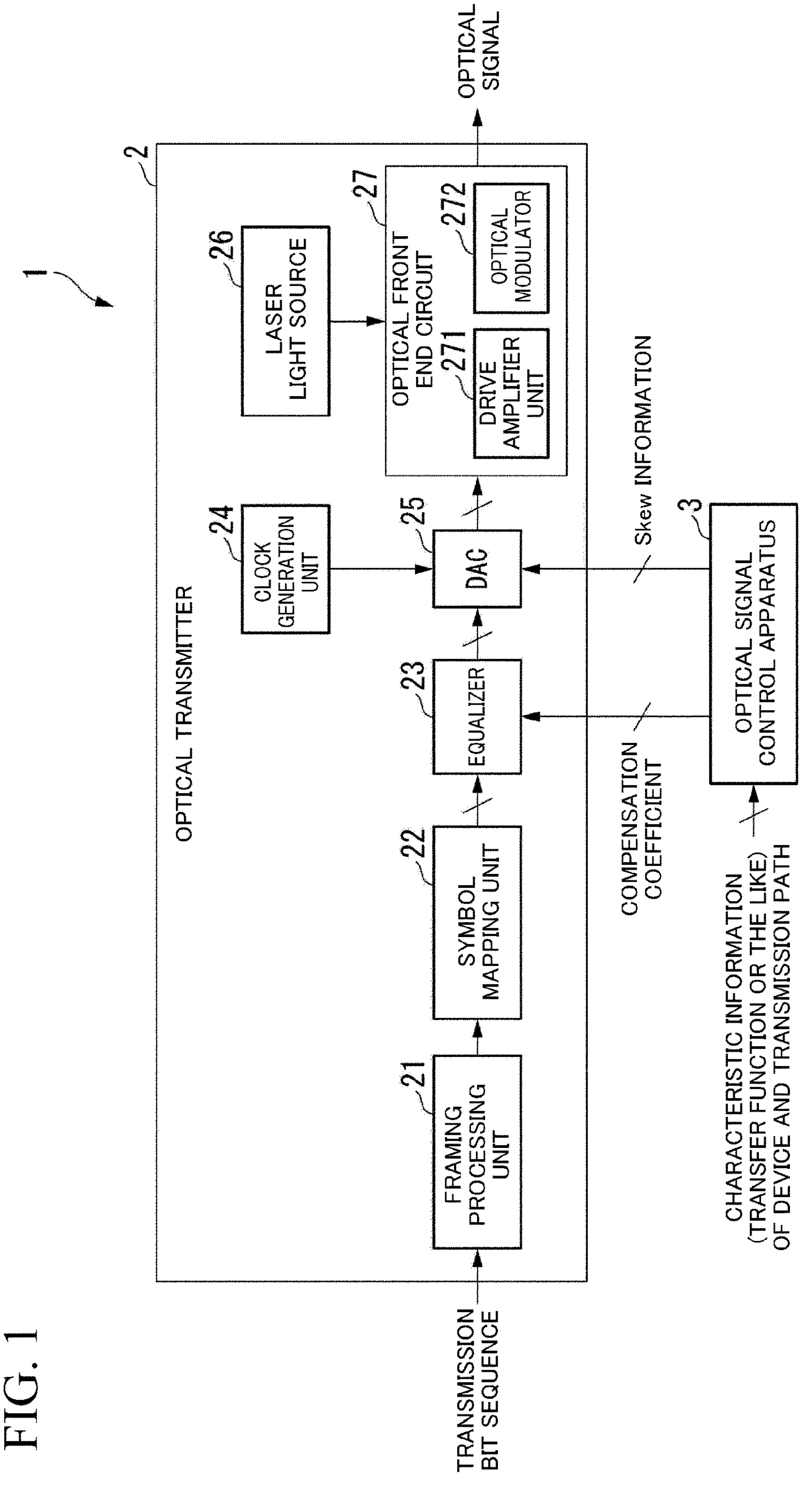
FIG. 1
1
2
OPTICAL TRANSMITTER
TRANSMISSION BIT SEQUENCE
21
FRAMING PROCESSING UNIT
22
SYMBOL MAPPING UNIT
23
EQUALIZER
24
CLOCK GENERATION UNIT
25
DAC
26
LASER LIGHT SOURCE
27
OPTICAL FRONT END CIRCUIT
271
DRIVE AMPLIFIER UNIT
272
OPTICAL MODULATOR
OPTICAL SIGNAL
3
OPTICAL SIGNAL CONTROL APPARATUS
Skew INFORMATION
COMPENSATION COEFFICIENT
CHARACTERISTIC INFORMATION (TRANSFER FUNCTION OR THE LIKE) OF DEVICE AND TRANSMISSION PATH g100
GROUP DELAY AMOUNT
g101
g102
g103
skew
g104
DC
FREQUENCY
g110
GROUP DELAY AMOUNT
g113
g111
DC
fs/2
FREQUENCY
g120
PHASE AMOUNT
DC
fs/2
FREQUENCY
g121
g123
0 OR nπ g200
AMPLITUDE
g202
g201
FREQUENCY
DC
fs/2
g210
PHASE AMOUNT
g211
FREQUENCY
DC
g212
0 OR n π
fs/2
CALCULATION OF INVERSE
CHARACTERISTIC AND
DOWNSAMPLING OF TRANSFER FUNCTION
g220
AMPLITUDE
g221
g223
g222
FREQUENCY
DC
fs/2
g230
PHASE AMOUNT
g232
FREQUENCY
DC
g231
fs/2

OPTICAL SIGNAL CONTROLLER, OPTICAL SIGNAL CONTROL METHOD, AND OPTICAL SIGNAL TRANSMISSION SYSTEM

CROSS-REFERENCE TO RELATED APPLICATIONS

This application is a 371 U.S. National Phase of International Application No. PCT/JP2021/020929, filed on Jun. 2, 2021. The entire disclosure of the above application is incorporated herein by reference.

TECHNICAL FIELD

The present invention relates to a technology of an optical signal control apparatus, an optical signal control method, and an optical signal transmission system.

BACKGROUND ART

In order to cope with an increase in communication traffic, a high speed and a large capacity of an optical transceiver are required. In order to increase a speed and a capacity of an optical transceiver, for example, a digital coherent technology in which digital signal processing (DSP) and coherent detection are combined is used. When such a method is used, transmission characteristics of an optical transceiver are estimated or compensated to obtain sufficient overall transmission characteristics (see, for example, PTL 1).

CITATION LIST

Patent Literature

[PTL 1] Japanese Patent No. 6319487

SUMMARY OF INVENTION

Technical Problem

However, in the technology of the related art, in order to reduce power consumption of an optical transceiver, when a digital-to-analog converter (DAC) is driven at the same sampling rate as a symbol period, a phase characteristic is 0 or $n\pi$ (where n is an integer) (that is, an integer multiple of $\pi$) because the amplitude characteristic is not changed. Therefore, from a sampling theorem, amplitude characteristics and phase characteristics cannot be set independently at a frequency which is half the sampling rate (a Nyquist frequency). Thus, the technology of the related art has a problem that a compensation effect of transfer characteristics cannot be sufficiently obtained.

In view of the foregoing circumstances, an object of the present invention is to provide a technology capable of compensating for transfer characteristics.

Solution to Problem

According to an aspect of the present invention, an optical signal control apparatus controls a compensation coefficient of an equalizer of an optical transmitter including the equalizer of a symbol period interval and a digital-to-analog converter (DAC) operating at a symbol period interval sampling rate and having a sampling phase adjustment function, and the sampling phase of the DAC. The optical signal control apparatus includes: a skew calculation unit configured to calculate a sampling phase amount from a group delay difference between an in-phase component and a quadrature component based on characteristic information of a device and a transmission path and to output the calculated sampling phase amount to the DAC; and a compensation coefficient calculation unit configured to calculate the compensation coefficient in which a phase characteristic of a Nyquist frequency of the DAC is 0 or an integer multiple of $\pi$ and to output the calculated compensation coefficient to the equalizer.

According to another aspect of the present invention, there is provided an optical signal control method of an optical signal control apparatus that controls a compensation coefficient of an equalizer of an optical transmitter including the equalizer of a symbol period interval and a digital-to-analog converter (DAC) operating at a symbol period interval sampling rate and having a sampling phase adjustment function, and the sampling phase of the DAC. The optical signal control method includes: calculating a sampling phase amount from a group delay difference between an in-phase component and a quadrature component based on characteristic information of a device and a transmission path and outputting the calculated sampling phase amount to the DAC; and calculating the compensation coefficient in which a phase characteristic of a Nyquist frequency of the DAC is 0 or an integer multiple of $\pi$ and outputting the calculated compensation coefficient to the equalizer.

According to another aspect of the present invention, an optical transmission system includes: an optical transmitter including an equalizer of a symbol period interval and a digital-to-analogue converter (DAC) operating at a symbol period interval sampling rate and having a sampling phase adjustment function; and an optical signal control apparatus including a skew calculation unit configured to calculate a sampling phase amount from a group delay difference between an in-phase component and a quadrature component based on characteristic information of a device and a transmission path and to output the calculated sampling phase amount to the DAC and a compensation coefficient calculation unit configured to calculate the compensation coefficient in which a phase characteristic of a Nyquist frequency of the DAC is 0 or an integer multiple of $\pi$ and to output the calculated compensation coefficient to the equalizer.

Advantageous Effects of Invention

According to the present invention, it becomes possible to compensating for transmission characteristics.

BRIEF DESCRIPTION OF DRAWINGS

FIG. 1 is a diagram showing an exemplary configuration of an optical signal transmission system including an optical signal control apparatus according to a first embodiment.

DESCRIPTION OF EMBODIMENTS

Figure 2:
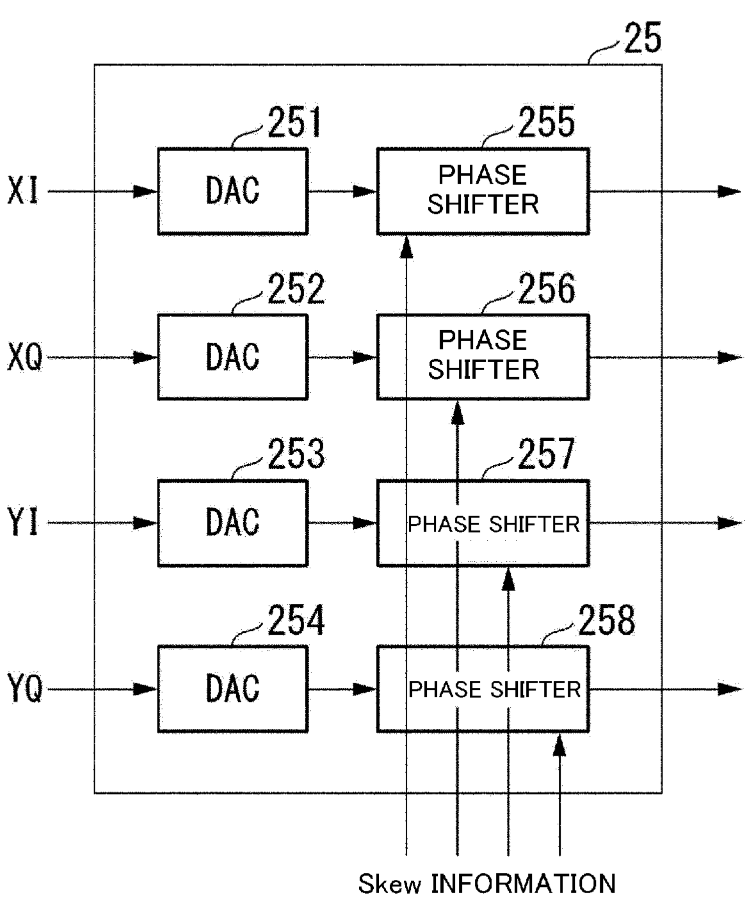
FIG. 2 is a diagram showing an exemplary configuration of a DAC according to the first embodiment.

Embodiments of the present invention will be described in detail with reference to the diagrams.

First Embodiment

FIG. 1 is a diagram showing an exemplary configuration of an optical signal transmission system including an optical signal control apparatus according to the present embodiment. As shown in FIG. 1, an optical signal transmission system 1 includes an optical transmitter 2 and an optical signal control apparatus 3.

The optical transmitter 2 includes, for example, a framing processing unit 21, a symbol mapping unit 22, an equalizer 23, a clock generation unit 24, a DAC 25, a laser light source 26, and an optical front end circuit 27.

The optical transmitter 2 converts a transmission bit sequence input from an external apparatus (not shown) into an optical signal.

The framing processing unit 21 converts the transmission bit sequence into a frame with a format appropriate for transmission. The framing processing unit 21 may perform encoding of an error correction code, inserting of a pilot signal, and the like.

The symbol mapping unit 22 converts the framed bit sequence into a symbol sequence.

The equalizer 23 adds a transfer function which is an inverse characteristic of a response by a transmission device, a reception device, a transmission path, or the like through a finite impulse response (FIR) filter or a frequency domain equalizer. The equalizer 23 is an equalizer of a sampling interval of a symbol period. The equalizer 23 compensates for the transfer function of a transmission device, a reception device, a transmission path, and the like by using a compensation coefficient output by the optical signal control apparatus 3.

The clock generation unit 24 generates a clock signal of a predetermined frequency and outputs the generated clock signal to the DAC 25.

The DAC 25 is a four-channel DAC. The DAC 25 changes phases of four input channel signals (XI, XQ, YI, YQ) of the DAC 25 by using sampling phase information (hereinafter referred to as "skew information") output by the optical signal control apparatus 3. Here, XI is an in-phase (I) component of a horizontally polarized wave (X-polarized wave), and XQ is a quadrature (Q) component of the horizontally polarized wave. YI is an in-phase component of a vertically polarized wave (Y-polarized wave) and YQ is a quadrature component of the vertically polarized wave. The DAC 25 may also have two channels. When the DAC 25 has two channels, the optical transmitter 2 is a single polarized wave transmitter. In this case, the DAC 25 may include a DAC of an I channel and a DAC of a Q channel. A configuration of the DAC 25 will be described below.

The laser light source 26 supplies continuous wave (CW) light to the optical modulator 272.

The optical front end circuit 27 includes a driver amplifier 271 and an optical modulator 272 that amplifies a modulation signal output from the DAC 25. The optical front end circuit 27 converts an electric signal into an optical signal.

The optical signal control apparatus 3 acquires characteristic information (for example, a transfer function or the like) of a device and a transmission path from an external apparatus (not shown) and generates a compensation coefficient and skew information based on the acquired characteristic information of the device and the transmission path. The optical signal control apparatus 3 may be included in the optical transmitter 2. The details of the optical signal control apparatus 3 will be described below.

(Exemplary Configuration of DAC 25)

Next, an exemplary configuration of the DAC 25 will be described.

FIG. 2 is a diagram showing an exemplary configuration of a DAC according to the present embodiment. As shown in FIG. 2, the DAC 25 includes, for example, DACs 251 to 254 and phase shifters 255 to 258.

The DAC 251 converts the digital signal of the input XI channel into an analogue signal and outputs the converted signal of the XI channel to the phase shifter 255.

The DAC 252 converts the input digital signal of the XQ channel into an analogue signal and outputs the converted signal of the XQ channel to the phase shifter 256.

The DAC 253 converts the digital signal of the input YI channel into an analogue signal and outputs the converted signal of the YI channel to a phase shifter 257.

The DAC 254 converts the input digital signal of the YQ channel into an analogue signal and outputs the converted signal of the YQ channel to a phase shifter 258.

A clock signal to be driven is input to each of the DAC 251 to the DAC 254 from the clock generation unit 24.

The phase shifter 255 changes the phase of the signal of the XI channel by using the skew information output from the optical signal control apparatus 3.

The phase shifter 256 changes the phase of the signal of the XQ channel by using the skew information output from the optical signal control apparatus 3.

The phase shifter 257 changes the phase of the signal of the YI channel by using the skew information output from the optical signal control apparatus 3.

The phase shifter 258 changes the phase of the signal of the YQ channel by using the skew information output from the optical signal control apparatus 3.

The phase shifters 255 to 258 may change phases between the XI, XQ, YI, and YQ channels, may change phases of clocks for driving the DAC 251 to the DAC 254 between the XI, XQ, YI, and YQ channels, or may have different configurations as long as a skew between lanes can change (for example, XI and XQ).

(Exemplary Configuration of Optical Signal Control Apparatus 3)

Next, an exemplary configuration of the optical signal control apparatus 3 will be described.

Figure 3:
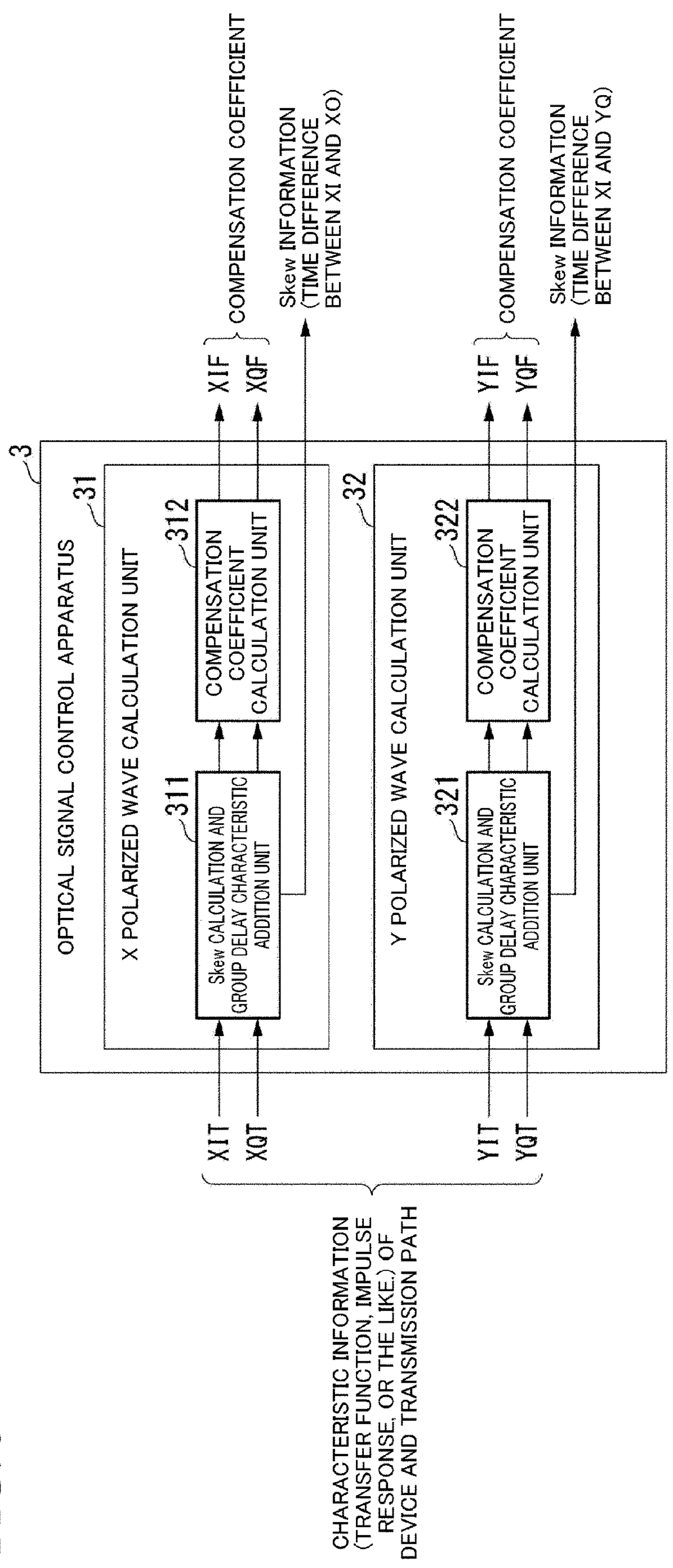
FIG. 3 is a diagram showing an exemplary configuration of the optical signal control apparatus according to the first embodiment.

FIG. 3 is a diagram showing an exemplary configuration of the optical signal control apparatus according to the present embodiment. As shown in FIG. 3, the optical signal control apparatus 3 includes, for example, an X polarized wave calculation unit 31 and a Y polarized wave calculation unit 32.

The X polarized wave calculation unit 31 includes a skew calculation and group delay characteristic addition unit 311 (skew calculation unit) and a compensation coefficient calculation unit 312.

The Y polarized wave calculation unit 32 includes a skew calculation and group delay characteristic addition unit 321 (skew calculation unit) and a compensation coefficient calculation unit 322.

The skew calculation and group delay characteristic addition unit 311 calculates a group delay characteristic difference (around DC or an average value) skew between XI and XQ by using characteristic information XIT of the XI channel device and the transmission path input from an external apparatus and characteristic information XIT of the XQ channel device and the transmission path. The skew calculation and group delay characteristic addition unit 311 outputs the calculated skew information between the XI and XQ to the DAC 25. The skew calculation and group delay characteristic addition unit 311 shifts the group delay characteristic of the XI channel or the XQ channel by the difference of the group delay characteristic. Further, the skew calculation and group delay characteristic addition unit 311 adds group delay to the characteristics of the XI channel and the XQ channel so that the phase characteristic of the Nyquist frequency of the DAC 25 becomes 0. The skew calculation and group delay characteristic addition unit 311 outputs amplitude characteristics and transfer characteristics of transfer functions of the XI channel and the XQ channel in which the group delay characteristic is changed to the compensation coefficient calculation unit 312.

The compensation coefficient calculation unit 312 calculates amplitude characteristics of transfer functions of the XI channel and the XQ channel in which the group delay characteristic is changed, and an inverse characteristic of the transfer characteristic. In this case, the compensation coefficient calculation unit 312 calculates a compensation coefficient XIF for the XI channel and a compensation coefficient XQF for the XQ channel which are downsampled for the input transfer function, and outputs the calculated compensation coefficient XIF for the XI channel and the compensation coefficient XQF for the XQ channel to the equalizer 23.

The skew calculation and group delay characteristic addition unit 321 calculates a group delay characteristic difference (around DC or an average value) skew between YI and YQ by using characteristic information YIT of the YI channel device and the transmission path input from an external apparatus and characteristic information YIT of the YQ channel device and the transmission path. The skew calculation and group delay characteristic addition unit 321 outputs the calculated skew information between YI and YQ to the DAC 25. The skew calculation and group delay characteristic addition unit 321 shifts the group delay characteristic of the YI channel or the YQ channel by the difference of the group delay characteristic. Further, the skew calculation and group delay characteristic addition unit 321 adds a group delay to characteristics of the YI channel and the YQ channel so that the phase characteristic of the Nyquist frequency of the DAC 25 becomes 0. The skew calculation and group delay characteristic addition unit 321 outputs the group delay characteristic of the changed YI channel or the YQ channel to the compensation coefficient calculation unit 322.

The compensation coefficient calculation unit 322 calculates an inverse characteristic of the group delay characteristic of the changed YI channel or the YQ channel. At this time, the compensation coefficient calculation unit 322 calculates a compensation coefficient YIF for the YI channel and a compensation coefficient YQF for the YQ channel which are downsampled with respect to the input transfer function, and outputs the calculated compensation coefficient YIF for the YI channel and the compensation coefficient YQF for the YQ channel to the equalizer 23.

The optical signal control apparatus 3 may be configured using a processor such as a central processing unit (CPU) and a memory. The optical signal control apparatus 3 may function as the X polarized wave calculation unit 31, the skew calculation and group delay characteristic addition unit 311, the compensation coefficient calculation unit 312, the Y polarized wave calculation unit 32, the skew calculation and group delay characteristic addition unit 321, and the compensation coefficient calculation unit 322 by the processor executing a program. All or some of the functions of the optical signal control apparatus 3 may be implemented using hardware such as an application specific integrated circuit (ASIC), a programmable logic device (PLD), or a field programmable gate array (FPGA). The foregoing program may be recorded on a computer-readable recording medium. The computer-readable recording medium is, for example, a portable medium such as a flexible disk, a magneto-optical disc, a ROM, a CD-ROM, or a semiconductor storage apparatus (for example, a solid state drive (SSD)) or a storage apparatus such as a hard disk or a semiconductor storage apparatus embedded in a computer system. The foregoing program may be transmitted via an electric communication line or an optical line.

(Exemplary Operation of Optical Signal Control Apparatus 3)

Next, an exemplary operation of the optical signal control apparatus 3 will be described. First, an exemplary operation of the skew calculation and group delay characteristic addition unit will be described by taking the skew calculation and group delay characteristic addition unit 311 as an example.

Figure 4:
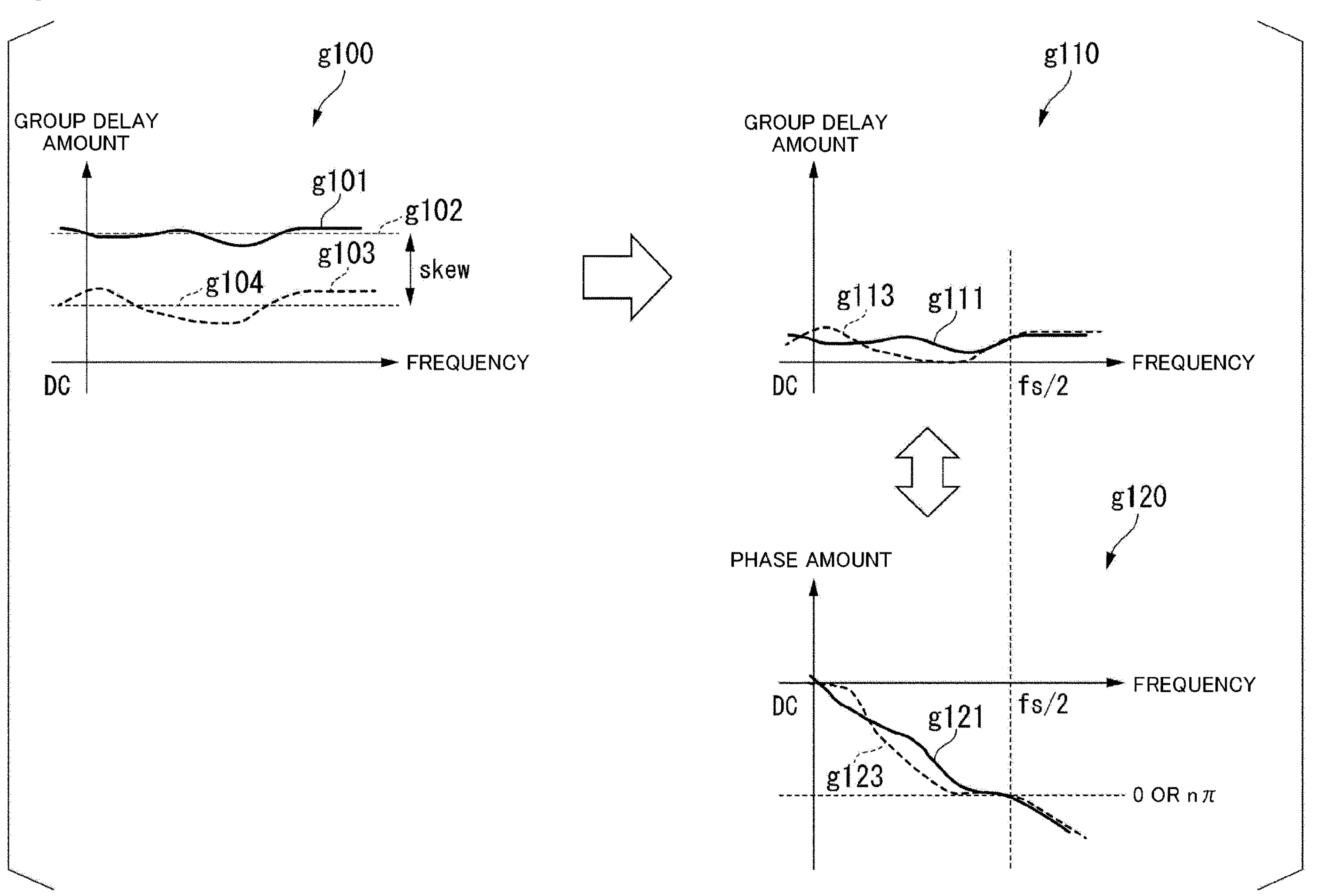
FIG. 4 is a diagram showing an exemplary operation of a skew calculation and group delay characteristic addition unit according to the first embodiment.

FIG. 4 is a diagram showing an exemplary operation of a skew calculation and group delay characteristic addition unit according to the present embodiment. XI and XQ will be described in FIG. 4, but the same processing is also performed on YI and YQ.

In FIG. 4, a graph g100 shows an example of the group delay characteristic before the change. In the graph g100, the horizontal axis represents the frequency, and the vertical axis represents the group delay amount. A solid line g101 indicates the group delay characteristic of the XI channel, and the chain line g102 indicates an average value of the group delay characteristic of the XI channel. A solid line g103 indicates the group delay characteristic of the XQ channel, and a chain line g104 indicates an average value of the group delay characteristic of the XQ channel. A skew amount is a difference between the average value (g102) of the group delay characteristic of the XI channel and the average value (g104) of the group delay characteristic of the XQ channel. The skew calculation and group delay characteristic addition unit 311 calculates, for example, the skew amount from the difference between the average value of the group delay characteristic of the XI channel and the average value of the group delay characteristic of the XQ channel in this way. As shown in FIG. 4, the skew calculation and group delay characteristic addition unit 311 does not change the amplitude characteristic.

Graphs g110 and g120 are graphs used to describe processing for adding a group delay. The horizontal axes of the graphs g110 and g120 represent the frequency, the vertical axis of the graph g110 represents a delay amount, and the vertical axis of the graph g120 is a phase amount. In the graphs g110 and g120, a frequency fs/2 is a Nyquist frequency of the DAC 25. Further, fs is a symbol rate. A solid line g111 indicates a group delay amount of the XI channel after correction of the skew amount and a solid line g113 indicates a group delay amount of the XQ channel after correction of the skew amount. The skew calculation and group delay characteristic addition unit 311 sets the minimum value of the group delay amount after correction of the skew amount to DC (=0), for example, as shown in the graph g110.

Further, the skew calculation and group delay characteristic addition unit 311 adds the group delay to the transfer function of the XI channel and the XQ channel so that a phase amount in the phase characteristic of the Nyquist frequency in the DAC 25 becomes 0 or $n\pi$ (where n is an integer), as shown in the graph g120. In a graph g120, a line g121 indicates a transfer characteristic of the XI channel to which the group delay is added, and a line g123 indicates a transfer characteristic of the XQ channel to which the group delay is added.

Next, an exemplary operation of the compensation coefficient calculation unit will be described by taking the compensation coefficient calculation unit 312 as an example.

Figure 5:
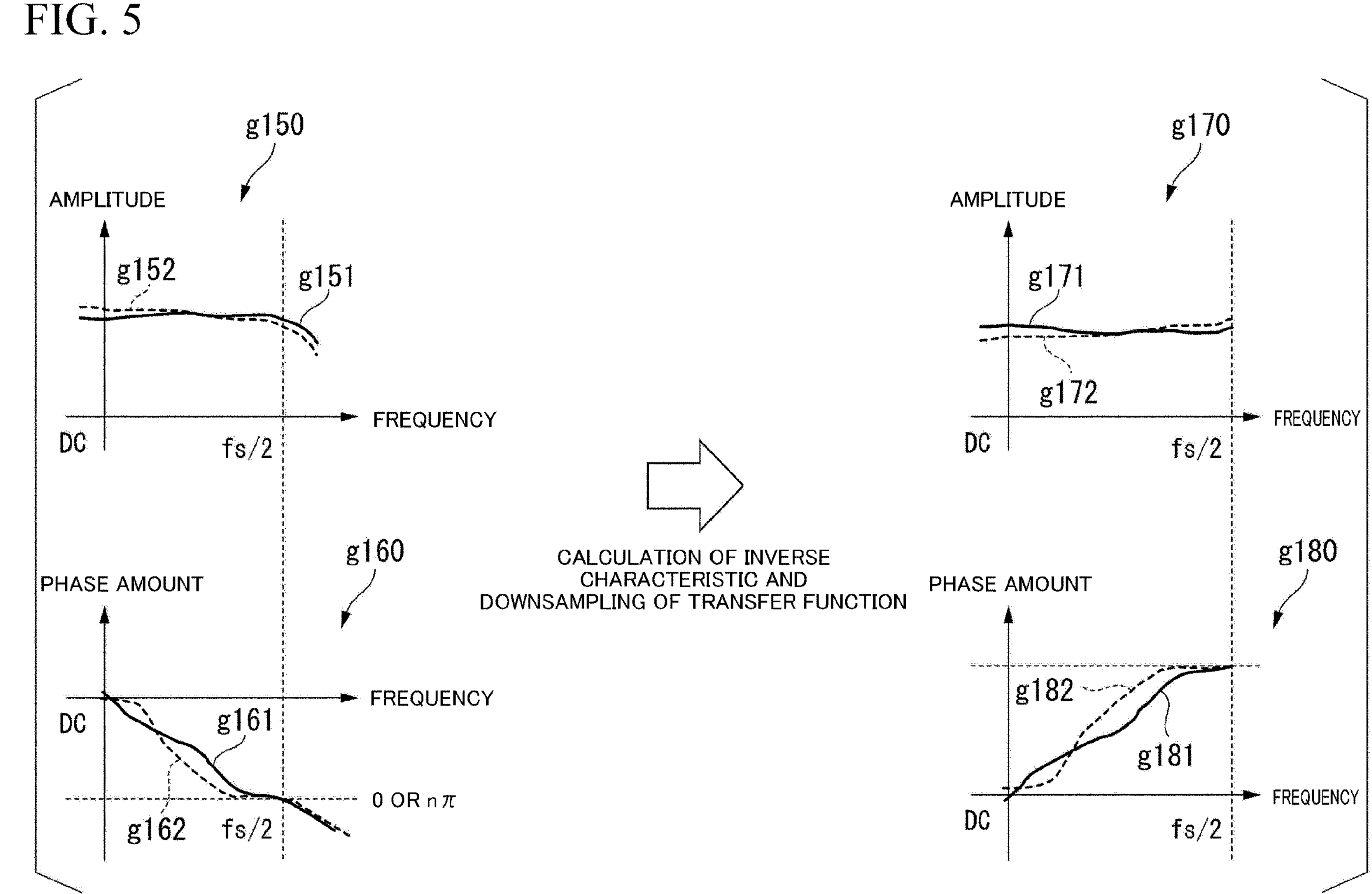
FIG. 5 is a diagram showing an exemplary operation of a compensation coefficient calculation unit according to the first embodiment.

FIG. 5 is a diagram showing an exemplary operation of a compensation coefficient calculation unit according to the present embodiment.

The compensation coefficient calculation unit 312 acquires an amplitude characteristic (graph g150) of the transfer coefficient output by the skew calculation and group delay characteristic addition unit 311 and a phase characteristic (graph g160) of the transfer function. The horizontal axes of the graphs g150 and g160 represent the frequency, the vertical axis of the graph g150 represents magnitude of the amplitude, and the vertical axis of the graph G160 represents a phase amount. In the graphs g150 and g160, lines g151 and g161 indicate the characteristic of the XI channel, and lines g152 and g162 indicate the characteristic of the XQ channel. XI and XQ will be described in FIG. 5, but the same processing is also performed for YI and YQ.

The compensation coefficient calculation unit 312 calculates the amplitude characteristic of the transfer coefficient and each inverse characteristic of the phase characteristic of the transfer function, and performs downsampling of the transfer characteristics. As a result, the compensation coefficient calculation unit 312 obtains a transfer characteristic (an amplitude characteristic of a graph g170 and a phase characteristic of a graph G180). The transfer characteristic (an amplitude characteristic of the graph g170 and a phase characteristic of the graph g180) is a compensation coefficient. The compensation coefficient calculation unit 312 outputs the compensation coefficient to the equalizer 23.

(Example of Processing Procedure of Optical Signal Control Apparatus 3)

Figure 6:
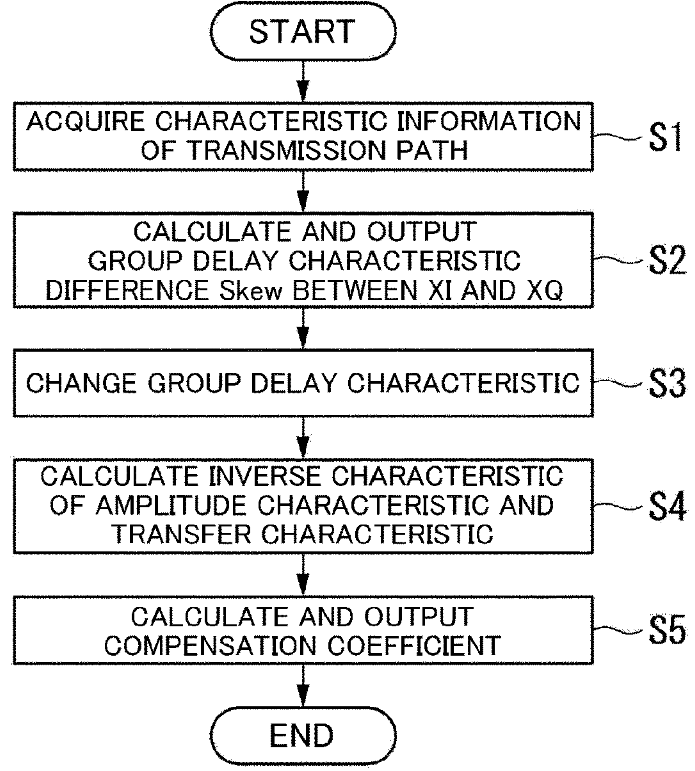
FIG. 6 is a flowchart showing an example of a processing procedure of the optical signal control apparatus according to the first embodiment.

Next, an example of a processing procedure of the optical signal control apparatus 3 will be described. FIG. 6 is a flowchart showing an example of a processing procedure of the optical signal control apparatus 3 according to the present embodiment.

(Step S1) The skew calculation and group delay characteristic addition unit 311 acquires the characteristic information XIT of an XI channel device and a transmission path and characteristic information XIT of an XQ channel device and a transmission path from an external apparatus. The skew calculation and group delay characteristic addition unit 321 acquires characteristic information YIT of a YI channel device and a transmission path and characteristic information YIT of a YQ channel device and a transmission path from an external apparatus.

(Step S2) The skew calculation and group delay characteristic addition unit 311 calculates a group delay characteristic difference (around DC, an average value, or the like) between XI and XQ by using the acquired information, and outputs the calculated skew information to the DAC 25. The skew calculation and group delay characteristic addition unit 321 calculates a group delay characteristic difference (around DC, an average value, or the like) skew between YI and YQ by using the acquired information, and outputs the calculated skew information to the DAC 25.

(Step S3) The skew calculation and group delay characteristic addition unit 311 shifts the group delay characteristic by a difference of the group delay characteristic, adds the group delay to the characteristics of the XI channel and the XQ channel so that the phase characteristic of the Nyquist frequency of the DAC 25 becomes 0, and changes the group delay characteristic. The skew calculation and group delay characteristic addition unit 321 shifts the group delay characteristic by a difference of the group delay characteristic, adds the group delay to the characteristics of the YI channel and the YQ channel so that the phase characteristic of the Nyquist frequency of the DAC 25 becomes 0, and changes the group delay characteristic.

(Step S4) The compensation coefficient calculation unit 312 calculates amplitude characteristics of the transfer functions of the XI channel and the XQ channel whose group delay characteristics are changed and inverse characteristics of the transfer characteristics. The compensation coefficient calculation unit 322 calculates amplitude characteristics of transfer functions of the YI channel and the YQ channel in which the group delay characteristics are changed and inverse characteristics of the transfer characteristics.

(Step S5) The compensation coefficient calculation unit 312 calculates a compensation coefficient XIF for the XI channel and a compensation coefficient XQF for the XQ channel which are downsampled with respect to the input transfer function, and outputs the calculated compensation coefficient XIF for the XI channel and the compensation coefficient XQF for the XQ channel to the equalizer 23. The compensation coefficient calculation unit 322 calculates a compensation coefficient YIF for the YI channel and a compensation coefficient YQF for the YQ channel which are downsampled with respect to the input transfer function, and outputs the calculated compensation coefficient YIF for the YI channel and the compensation coefficient YQF for the YQ channel to the equalizer 23.

Next, the reason why any amplitude characteristic and a phase characteristic cannot be achieved at a frequency which is half a sampling rate (Nyquist frequency) will be described. An amplitude A(k) of a k-th sampling point is expressed as in the following Expression (1) for a sine wave of the frequency f sampled at a period $T_0$ and an initial phase $\theta_0$.

[Expression 1]

$$A(k)=\cos(2\pi fkT_0+\theta_0) \tag{1}$$

The Nyquist frequency in a sampling period $T_0$ is $f=\frac{1}{2}T_0$ and is expressed in the following Expression (2).

[Math. 2]

$$A(k)=\cos(\pi f+\theta_0)=\cos\theta_0\cos(\pi k) \quad (2)$$

Figure 7:
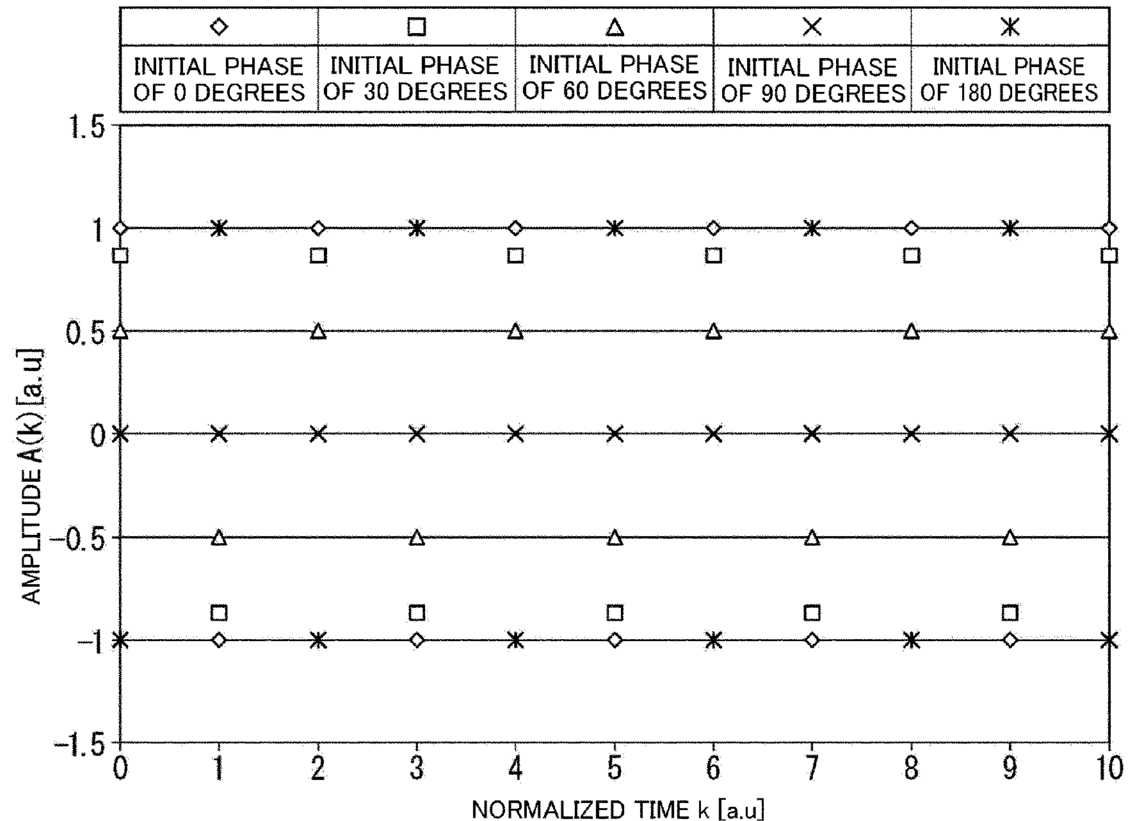
FIG. 7 is a diagram showing a relationship between a normalized time k and an amplitude (k) when an initial phase $\theta_0$ is changed in Expression (2).

FIG. 7 is a diagram showing a relationship between a normalized time k and an amplitude (k) when the initial phase $\theta_0$ is changed in Expression (2). In FIG. 6, the horizontal axis represents the normalized time k [a. u. (any unit)], and the vertical axis represents the amplitude (K) [a. u.]. As shown in FIG. 6, when the initial phase is not a multiple of π, such as 0 or 180 degrees, the amplitude is reduced. This is because the initial phase of Expression (1) corresponds to the phase characteristic in the transfer function, and therefore the amplitude characteristic is also changed by changing the phase characteristic. Therefore, in order to implement any amplitude characteristic at the Nyquist frequency, it is necessary to set the phase characteristic to nπ (where n is an integer).

The reason why the group delay characteristic is added will be described below.

Figure 8:
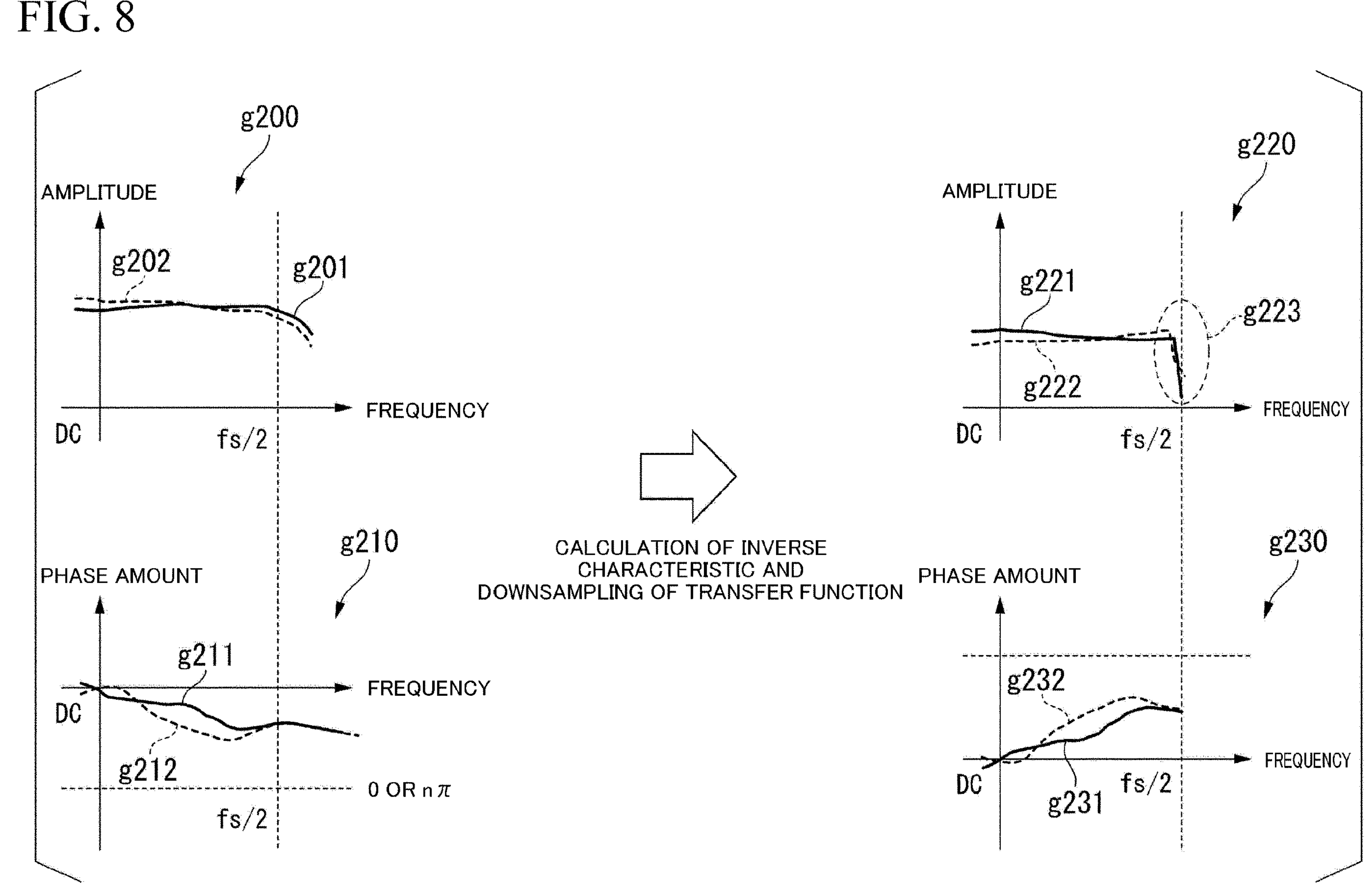
FIG. 8 is a diagram showing a reason for adding a group delay characteristic.

FIG. 8 is a diagram showing a reason why a group delay characteristic is added.

A graph g200 indicates an amplitude characteristic of the transfer coefficient. A graph g210 indicates a phase characteristic of the transfer function when the group delay characteristic is not added. The horizontal axes of the graphs g200 and g210 represent a frequency, the vertical axis of the graph g200 represents magnitude of the amplitude, and the vertical axis of the graph g210 represents a phase amount. In the graphs g200 and g210, lines g201 and g211 indicate the characteristic of the XI channel, and lines g202 and g212 indicate a characteristic of the XQ channel.

When the group delay characteristic is not added as in the graph g210, the phase characteristic is not 0 or nπ at the Nyquist frequency fs/2 of the DAC 25.

Graphs g220 and g230 are characteristics obtained by calculating the inverse characteristic of the amplitude characteristic of the transfer coefficient and the phase characteristic of the transfer function and performing downsampling of the transfer characteristic without adding the group delay characteristic. The horizontal axes of the graphs g220 and g230 are a frequency, the vertical axis of the graph g220 represents magnitude of the amplitude, and the vertical axis of the graph g230 represents the phase amount. In the graphs g220 and g230, lines g221 and g231 indicate the characteristic of the XI channel, and lines g222 and g222 indicate the characteristic of the XQ channel.

When the inverse characteristic of the amplitude characteristic is calculated without adding the group delay characteristic, the amplitude characteristic suddenly changes at the Nyquist frequency fs/2 of the DAC 25 like a circle g223 surrounded by a dotted line of a graph g220.

In order to prevent a change in the amplitude characteristic at the Nyquist frequency fs/2, a group delay characteristic is added in the present embodiment.

In the optical signal transmission system 1 and the optical signal control apparatus 3 configured in this way, since the phase characteristic of the Nyquist frequency becomes close to 0 or nπ by shifting the sampling phase when the coefficient is calculated. Therefore, it is possible to compensate for the transfer characteristic of the device with high accuracy even when the DAC 25 for symbol period sampling is used.

Second Embodiment

Figure 9:
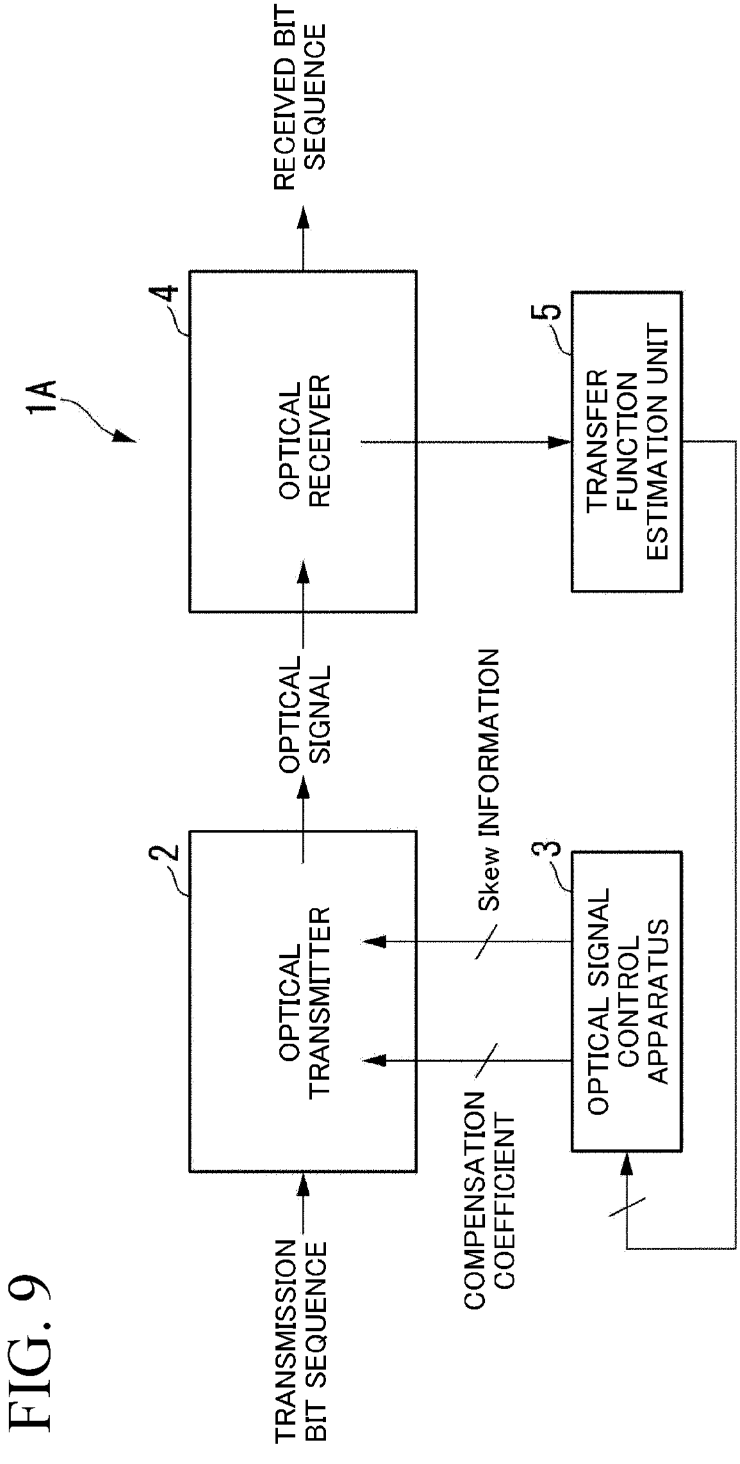
FIG. 9 is a diagram showing an exemplary configuration of an optical signal transmission system according to a second embodiment.

FIG. 9 is a diagram showing an exemplary configuration of an optical signal transmission system according to the present embodiment. As shown in FIG. 9, the optical signal transmission system 1A includes an optical transmitter 2, an optical signal control apparatus 3, an optical receiver 4, and a transfer function estimation unit 5.

The optical receiver 4 converts the received optical signal into a baseband digital signal. An exemplary configuration of the optical receiver 4 will be described below.

The transfer function estimation unit 5 acquires signals of XI, XQ, YI and YQ channels from the optical receiver 4 and estimates a transfer function of a transmission device, a reception device, a transmission path or the like by using signals of the acquired XI, XQ, YI and YQ channels. The transfer function estimation unit 5 outputs the estimated transfer function to the optical signal control apparatus 3. An exemplary configuration of the transfer function estimation unit 5 will be described below. The transfer function estimation unit 5 may include, for example, the optical receiver 4.

(Exemplary Configuration of Optical Receiver)

Next, an exemplary configuration of the optical receiver 4 will be described.

Figure 10:
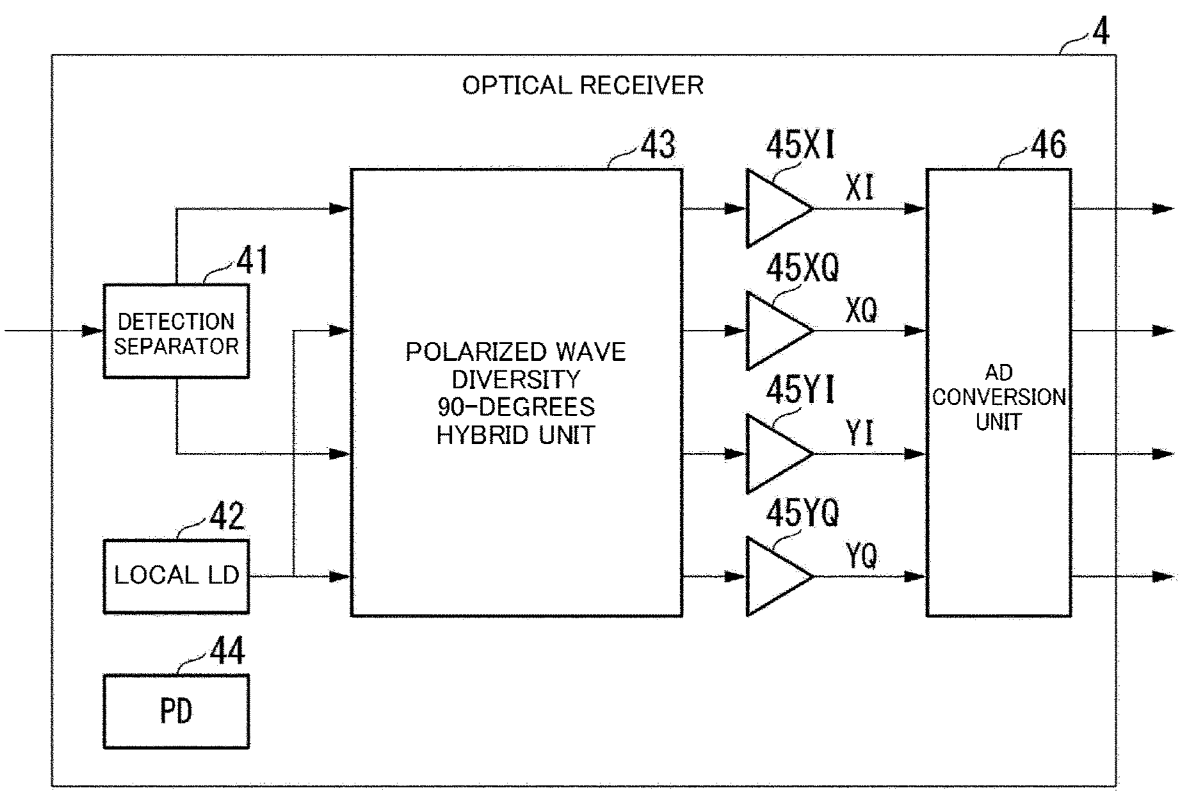
FIG. 10 is a diagram showing an exemplary configuration of an optical receiver.

FIG. 10 is a diagram showing an exemplary configuration of an optical receiver. As shown in FIG. 10, the optical receiver 4 includes, for example, a polarized wave separator 41, a local LD 42 (laser module), a polarized wave diversity 90-degrees hybrid unit 43, a PD 44 (photodiode), TIAs (transmittance amplifiers) 45 (45XI, 45XQ, 45YI, and 45YQ), and an AD converter 46 (see, for example, PTL 1).

The local LD 42 transmits CW light of linearly polarized light to the polarized wave diversity 90-degrees hybrid unit 43. The polarized wave diversity 90-degrees hybrid unit 43 causes the received optical signal and the CW light to interfere with each other. The PD 44 photoelectrically converts the interfering light. A TIA 45 converts the current signal photoelectrically converted by the PD 44 into a voltage signal. The AD converter 46 converts a voltage signal of an analog signal converted tp a voltage by the TIA 45 into a digital signal.

The configuration of the optical receiver 4 shown in FIG. 10 is an example, and the present invention is not limited thereto.

(Exemplary Configuration of Transfer Function Estimation Unit)

An exemplary configuration of the transfer function estimation unit 5 will be described below.

Figure 11:
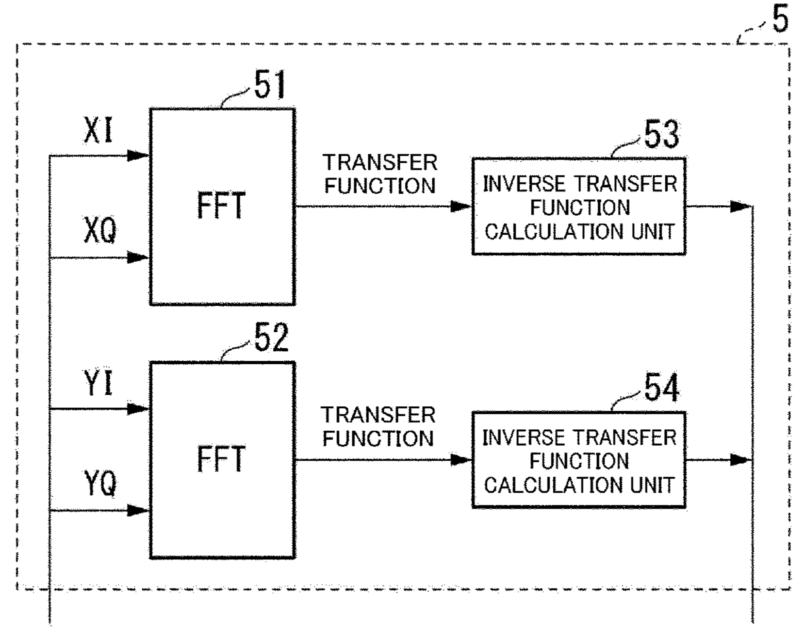
FIG. 11 is a diagram showing an exemplary configuration of a transfer function estimation unit according to the second embodiment.

FIG. 11 is a diagram showing an exemplary configuration of a transfer function estimation unit according to the present embodiment. As shown in FIG. 11, the transfer function estimation unit 5 includes, for example, an FFT 51, an FFT 52, an inverse transfer function calculation unit 53, and an inverse transfer function calculation unit 54 (for example, see PTL 1).

An exemplary configuration of the transfer function estimation unit 5 shown in FIG. 11 is an example, and the present invention is not limited thereto.

The FFT 51 applies fast Fourier transform (FFT) processing to a received signal of the X polarized wave. The FFT 52 applies FFT processing to each of the received signals of Y polarized waves. The inverse transfer function calculation unit 53 performs 1/transfer function processing of an output of the FFT 51 to calculate an inverse transfer function. The inverse transfer function calculation unit 54 performs 1/transfer function processing of the output of the FFT 52 to calculate an inverse transfer function.

The inverse transfer function calculation unit 53 and the inverse transfer function calculation unit 54 may transmit the calculated inverse transfer function to the optical signal control apparatus 3. Thus, according to the present embodiment, it is not necessary to perform processing for obtaining the inverse characteristics in the compensation coefficient calculation units 312 and 322. The inverse transfer function calculation unit 53 and the inverse transfer function calculation unit 54 may convert the inverse characteristic into the forward characteristic. The inverse transfer function calculation unit 53 and the inverse transfer function calculation unit 54 may use a sampling rate of the DAC 25 in the optical transmitter 2 at a high speed at the time of estimation of the transfer function and estimate the transfer function until a frequency higher than a Nyquist frequency of a symbol rate.

The transfer function estimation unit 5 may be configured using a processor such as a central processing unit (CPU) and a memory. The transfer function estimation unit 5 may function as the FFT 51, the FFT 52, the inverse transfer function calculation unit 53, and the inverse transfer function calculation unit 54 by the processor executing a program. All or some of the functions of the transfer function estimation unit 5 may be implemented using hardware such as an application specific integrated circuit (ASIC), a programmable logic device (PLD), or a field programmable gate array (FPGA). The foregoing program may be recorded on a computer-readable recording medium. The computer-readable recording medium is, for example, a portable medium such as a flexible disk, a magneto-optical disc, a ROM, a CD-ROM, or a semiconductor storage apparatus (for example, a solid state drive (SSD)) or a storage apparatus such as a hard disk or a semiconductor storage apparatus embedded in a computer system. The foregoing program may be transmitted via an electric communication line or an optical line.

(Exemplary Method of Calculating Inverse Characteristic of Transfer Characteristic)

Next, an exemplary method for calculating the inverse characteristic of the transfer characteristic according to the present embodiment will be described. In the present embodiment, the transfer function input in the skew calculation processing of the first embodiment may be the inverse transfer function of the transmission path, and the processing for obtaining the inverse characteristic of the input transfer function in the compensation coefficient calculation of the first embodiment may not be performed. In the present embodiment, by adding the group delay to the inverse characteristic of the transfer function, it is possible to the same result as that obtained by obtaining the inverse characteristic after adding the group delay to the transfer function of the first embodiment.

Figure 12:
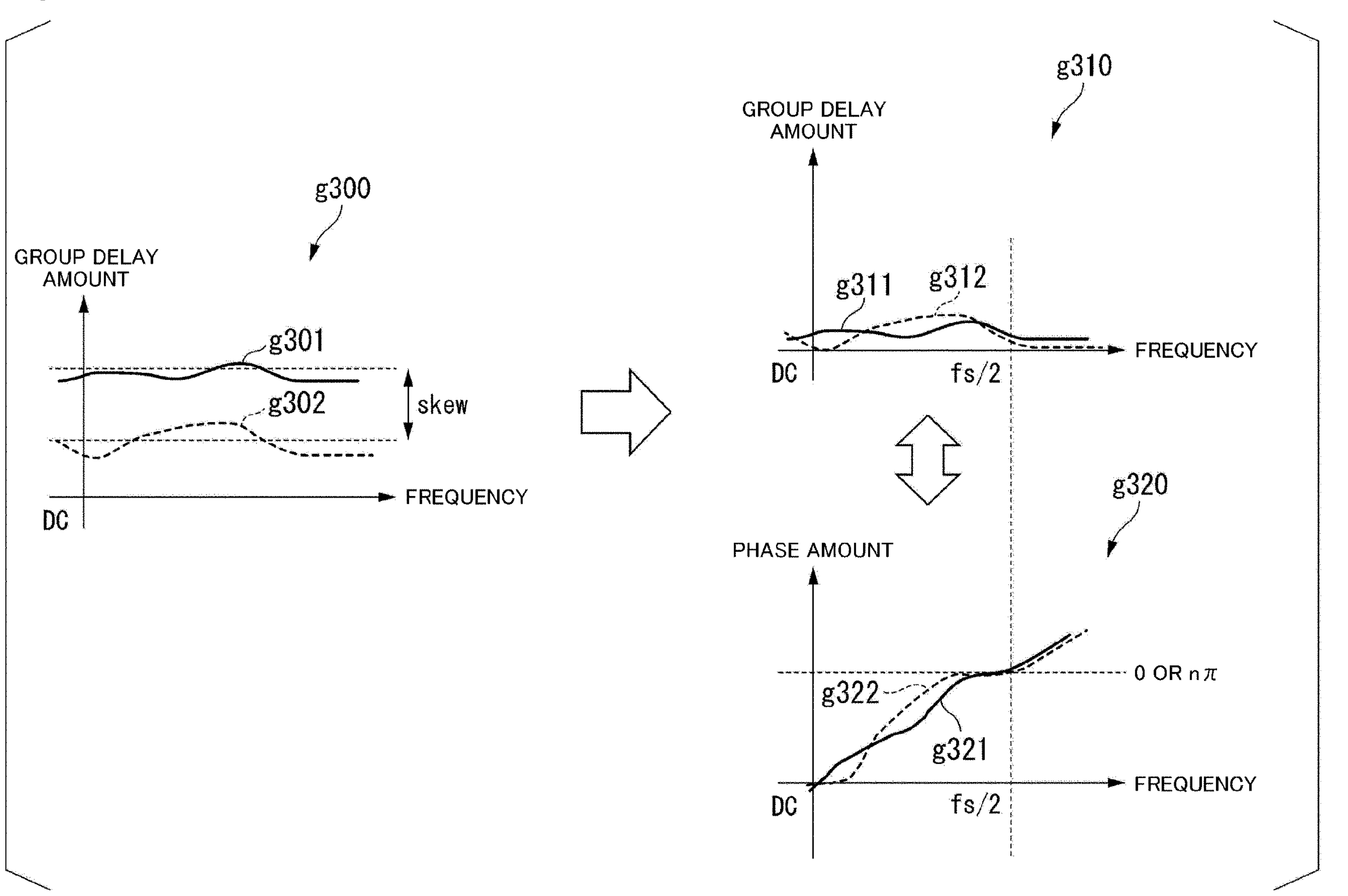
FIG. 12 is a diagram showing an exemplary method of calculating an inverse characteristic of a transfer characteristic according to the second embodiment.

FIG. 12 is a diagram showing an exemplary method of calculating an inverse characteristic of a transfer characteristic according to the present embodiment. XI and XQ will be described in FIG. 12, but the same processing is also performed for YI and YQ.

The skew calculation and group delay characteristic addition unit 311 calculates a skew from a group delay difference between XI (g301) and XQ (g302) as in a graph g300. In the graph g300, the horizontal axis represents a frequency, and the vertical axis represents a group delay amount.

Next, the skew calculation and group delay characteristic addition unit 311 eliminates a group delay difference between XI and XQ as in graphs g310 and g320, and simultaneously adds group delay to the transfer functions of XI and XQ so that the phase characteristic of the Nyquist frequency in the DAC 25 becomes 0 or $n\pi$. The graph g310 indicates a group delay characteristic. The horizontal axis represents a frequency and the vertical axis represents a group delay amount. The graph g320 indicates a phase characteristic. The horizontal axis represents a frequency and the vertical axis represents a phase amount.

In the optical signal transmission system 1, the optical signal control apparatus 3, and the transfer function estimation unit 5 configured in this way, the phase characteristic of the Nyquist frequency become close to 0 or $n\pi$ by shifting a sampling phase when the coefficient is calculated. Therefore, it is possible to compensate for the transfer characteristic of the device with high accuracy even when the DAC 25 for symbol period sampling is used.

Modification Example

In the above-described embodiment, the example in which the optical signal control apparatus 3 has two skew calculation and group delay characteristic addition units and two compensation coefficient calculation units has been described, but the present invention is not limited thereto. One skew calculation and group delay characteristic addition unit and one compensation coefficient calculation unit may be provided. In this case, the skew calculation and group delay characteristic addition unit may perform, for example, time division processing on an x-polarized component and a y-polarized component. Further, the compensation coefficient calculation unit may perform, for example, time division processing on the X-polarized component and the Y-polarized component.

In the above-described example, the optical transmitter 2 and the optical receiver 4 are separated from each other, but an optical transceiver that has functions of a transmitter and a receiver may be used.

Although the embodiments of the present invention have been described in detail with reference to the drawings, a specific configuration is not limited to the embodiments, and design within the scope of the gist of the present invention, and the like are included.

INDUSTRIAL APPLICABILITY

The present invention is applicable to control of an optical signal of an optical transmitter, an optical receiver, or an optical transceiver.

REFERENCE SIGNS LIST

- 1 Optical signal transmission system
- 2 Optical transmitter
- 3 Optical signal control apparatus
- 4 Optical receiver
- 5 Transfer function estimation unit
- 21 Framing processing unit
- 22 Symbol mapping unit
- 23 Equalizer
- 24 Clock generation unit
- 25 DAC
- 26 Laser light source
- 27 Optical front end circuit
- 31 X polarized wave calculation unit
- 32 Y polarized wave calculation unit
- 311 Skew calculation and group delay characteristic addition unit
- 312 Compensation coefficient calculation unit
- 321 Skew calculation and group delay characteristic addition unit
- 322 Compensation coefficient calculation unit

The invention claimed is:

1. An optical signal control apparatus that controls a compensation coefficient of an equalizer of an optical transmitter including the equalizer of a symbol period interval and a digital-to-analog converter (DAC) operating at a symbol period interval sampling rate and having a sampling phase adjustment function, and a sampling phase of the DAC, the optical signal control apparatus comprising:

a skew calculation unit configured to calculate a sampling phase amount from a group delay difference between an in-phase component and a quadrature component based on characteristic information, which includes a phase characteristic and an amplitude characteristic, of a device and a transmission path and to output the calculated sampling phase amount to the DAC; and a compensation coefficient calculation unit configured to calculate the compensation coefficient in which a phase amount of a Nyquist frequency of the DAC is 0 or an integer multiple of π and to output the calculated compensation coefficient to the equalizer, wherein:

the equalizer compensates a transfer function of the device and the transmission path using the calculated compensation coefficient; and the DAC shifts the phase characteristic of the in-phase component and that of the quadrature component by the group delay difference using the calculated sampling phase amount.

2. The optical signal control apparatus according to claim 1, wherein the skew calculation unit causes the DAC to shift the phase characteristic of the in-phase component and that of the quadrature component by the group delay difference, and adds a group delay to the transfer function of the in-phase component and the quadrature component to cause the compensation coefficient calculation unit to calculate the phase amount of the Nyquist frequency of the DAC is 0 or an integer multiple of π and supplies the transfer function coefficient added with the group delay to the compensation coefficient calculation unit.

3. The optical signal control apparatus according to claim 1, wherein the skew calculation unit outputs an amplitude characteristic of the transfer function of the in-phase component and the quadrature component and the phase characteristic of the transfer function of the in-phase component and the quadrature component to the compensation coefficient calculation unit, and the compensation coefficient calculation unit calculates an inverse characteristic of the amplitude characteristic and calculates a coefficient in which the phase characteristic is downsampled so as to supply to the equalizer as the calculated compensation coefficient.

4. The optical signal control apparatus according to claim 1, wherein the characteristic information of the device and the transmission path includes a transfer characteristic of the in-phase component of a polarized wave and a transfer characteristic of the quadrature component, skew information which has been calculated based on the transfer characteristic of the in-phase component of the polarized wave and the transfer characteristic of the quadrature component is supplied to a phase shifter of the DAC.

5. The optical signal control apparatus according to claim 1, further comprising a transfer function estimation unit configured to acquire a received signal received from an optical receiver that receives an optical signal, calculate a transfer function of the acquired received signal, and output the calculated transfer function to the skew calculation unit, wherein the transfer function estimation unit calculates an inverse transfer function of the transfer function, and the skew calculation unit adds a group delay to the inverse transfer function so that the phase characteristic of the Nyquist frequency in the DAC is 0 or an integer multiple of π so as to supply to the equalizer as the calculated compensation coefficient.

6. An optical signal control method of an optical signal control apparatus that controls a compensation coefficient of an equalizer of an optical transmitter including the equalizer of a symbol period interval and a digital-to-analog converter (DAC) operating at a symbol period interval sampling rate and having a sampling phase adjustment function, and a sampling phase of the DAC, the optical signal control method comprising:

calculating a sampling phase amount from a group delay difference between an in-phase component and a quadrature component based on characteristic information, which includes a phase characteristic and an amplitude characteristic, of a device and a transmission path and outputting the calculated sampling phase amount to the DAC;

calculating the compensation coefficient in which a phase amount of a Nyquist frequency of the DAC is 0 or an integer multiple of π and outputting the calculated compensation coefficient to the equalizer, compensating, by the equalizer, a transfer function of the device and the transmission path using the calculated compensation coefficient; and shifting, by the DAC, the phase characteristic of the in-phase component and that of the quadrature component by the group delay difference using the calculated sampling phase amount.

7. An optical signal transmission system comprising:

an optical transmitter including an equalizer of a symbol period interval and a digital-to-analog converter (DAC) operating at a symbol period interval sampling rate and having a sampling phase adjustment function; and an optical signal control apparatus including a skew calculation unit configured to calculate a sampling phase amount from a group delay difference between an in-phase component and a quadrature component based on characteristic information, which includes a phase characteristic and an amplitude characteristic, of a device and a transmission path and to output the calculated sampling phase amount to the DAC and a compensation coefficient calculation unit configured to calculate the compensation coefficient in which a phase amount of a Nyquist frequency of the DAC is 0 or an integer multiple of π and to output the calculated compensation coefficient to the equalizer, wherein: the equalizer compensates a transfer function of the device and the transmission path using the calculated compensation coefficient; and the DAC shifts the phase characteristic of the in-phase component and that of the quadrature component by the group delay difference using the calculated sampling phase amount.

8. The optical signal transmission system according to claim 7, further comprising:

an optical receiver configured to receive an optical signal; and a transfer function estimation unit configured to acquire a received signal received from the optical receiver and estimate a transfer function of the acquired received signal, wherein the optical signal transmission system configured to supply the estimated transfer function estimated by the transfer function estimation unit to the optical signal control apparatus so as to compensate the transfer function of the device and the transmission path.

* * * * *